United States Patent [19]

Yamaguchi et al.

[11] Patent Number: 4,545,500
[45] Date of Patent: Oct. 8, 1985

[54] MAGNETIC TAPE CASSETTE

[75] Inventors: Tokundo Yamaguchi, Tama; Masanori Kimizuka, Tokyo; Isao Kawashima, Hatoyama, all of Japan

[73] Assignee: Sony Corporation, Tokyo, Japan

[21] Appl. No.: 560,388

[22] Filed: Dec. 12, 1983

[30] Foreign Application Priority Data

Dec. 29, 1982 [JP] Japan .................................. 57-233190
Dec. 29, 1982 [JP] Japan .................................. 57-233189
Dec. 29, 1982 [JP] Japan .................................. 57-233188

[51] Int. Cl.$^4$ ............................................. G11B 23/02
[52] U.S. Cl. ................................... 220/4 B; 206/387; 242/197; 242/199
[58] Field of Search ............... 220/4 B, 4 E; 206/387; 242/197, 198, 199, 200

[56] References Cited

U.S. PATENT DOCUMENTS 3,693,907  9/1972  Prelletz .............................. 242/197
4,286,300  8/1981  Osanai .............................. 242/199

FOREIGN PATENT DOCUMENTS 2634161  2/1977  Fed. Rep. of Germany ...... 242/199
42389    3/1980  Japan .................................. 242/197

OTHER PUBLICATIONS

*Plastics Engineering Handbook,* 3rd Edition, Copyright 1960, pp. 118, 119, 120.

Primary Examiner—George E. Lowrance
Attorney, Agent, or Firm—Hill, Van Santen, Steadman & Simpson

[57] ABSTRACT

A tape cassette for holding a magnetic tape which is constituted by an upper half and a lower half which define a cassette case and a tape guide located therein, wherein at least one of the upper half, the lower half and the tape guide is made of material containing ceramics.

4 Claims, 3 Drawing Figures

MAGNETIC TAPE CASSETTE

BACKGROUND OF THE INVENTION

1. Field of the Invention

The present invention relates generally to improvements of a tape cassette for holding a magnetic tape within a cassette case. More particularly this invention relates to an upper half and a lower half which constitute a tape cassette and a tape guide member.

2. Description of the Prior Art

A conventional magnetic tape cassette is assembled in such a manner that an upper cassette half and a lower cassette half, each being molded from plastic material and approximately same in shape, are put together and fixed by screws. The magnetic tape cassette is provided through its front side wall with a plurality of opening portions through which a magnetic head, a pinch roller and the like of a tape recorder and so on are inserted thereinto. At predetermined positions near the inside of the opening portions, there are provided a tape guide pin, a tape guide member, a tape guide roller and a tape pad mechanism supported by a shield plate. Further, a magnetic tape wound around reels is held inside the cassette case so as to be transported along the tape guide member.

By the way, among the causes which will deteriorate the tone quality of a cassette tape recorder, as the cause owing to the tape cassette itself, there may be considered those from the tape guide system and the cassette half (cassette case) system.

In the cassette half system, since the whole thereof is molded from plastics, the cassette halves are apt to be deformed by distortion. And, since the deformed cassette case holds as it is therein the magnetic tape, poor transportation, track displacement, phase deviation and the like occur. As the causes why such distortion occurs in the cassette halves, there may be exemplified such causes that the shape of the cassette halves are quite complicated and in addition, the plastics forming the cassette halves are deformed by heat and stress.

On the other hand, in the tape guide system, in the inside of the cassette halves, there are provided a tape guide block (a collective member formed of a plurality of tape guide members) which faces to and exists near the front opening portion, tape guide pins and tape guide rollers formed at both sides of the tape guide block. Among those, the portion or member which most influences the tape running and recording and/or reproducing is the above tape guide block. The tape guide block member is formed integral with the cassette half from the plastic molding. The surface of the tape guide block member which contacts with the magnetic tape must be formed accurately vertical. However, since in order to facilitate the extraction of the cassette half from the metallic mold, a draft inclination is provided on the metallic mold, the tape guide surface is inevitably inclined a little. As a result, the tape guide surface can not be formed as the accurately vertical surface so that the magnetic tape can not be transported along the accurate straight line.

Moreover, the surface roughness of the tape guide block member is determined by the good or bad of the surface finishing of the metallic mold and the scar and deformation formed on the surface of the tape guide block member when the cassette half is drafted from the metallic mold. Accordingly, the friction state between the tape guide block member and the magnetic tape is changed thereby to cause the tone quality of individual tape cassettes to be scattered. Furthermore, since the above tape guide block member is made of plastic material, the shearing and the heat are caused by the sliding friction between the tape guide block member and the magnetic tape (which is normally provided by coating a magnetic paint on a film made of polyester resin) so that the magnetic tape is slackened. In addition, since the tape guide block member is provided only at one cassette half and guides the magnetic tape being transported, due to the contact force caused from the magnetic tape to the tape guide block member by the tape tension, the tape guide block member is easily distorted and this distortion is cooperated with the fluctuation of the tape tension to thereby cause the distorting vibration in the tape guide block member.

OBJECTS AND SUMMARY OF THE INVENTION

Accordingly, it is an object of the present invention to provide an improved tape cassette which can obviate the above defects inherent in the conventional tape cassette.

It is another object of the present invention to provide a tape cassette in which among an upper cassette half, a lower cassette half and a tape guide block including a plurality of tape guides, which are located in opposed relation to front openings of the cassette case and near the front openings, at least one of them is formed of a material containing ceramic material.

It is still another object of the present invention to provide a tape cassette in which a tape guide block thereof has excellent characteristics in vertical property, rigidity, wear-proof property, thermal conductivity and so on.

It is further object of the present invention to provide a tape cassette which can remove various causes of the deterioration of tone quality.

According to one aspect of the present invention, there is provided a tape cassette for holding a magnetic tape inside thereof comprising:
- a first member for forming an upper half;
- a second member for forming a lower half and for fitting said first member into said second member so as to define a case having an enclosed space for accommodating said magnetic tape;
- a plurality of openings formed in a front wall portion of said case; and
- a third member arranged in said case and positioned near said openings for guiding said tape, at least one of said first to third members being made of a material containing ceramics.

The other objects, features and advantages of the present invention will become apparent from the following description taken in conjunction with the accompanying drawings through which the like references designate the same elements and parts.

DESCRIPTION OF THE PREFERRED EMBODIMENTS

Now, the present invention will hereinafter be described in detail with reference to the attached drawings.

Figure 1:
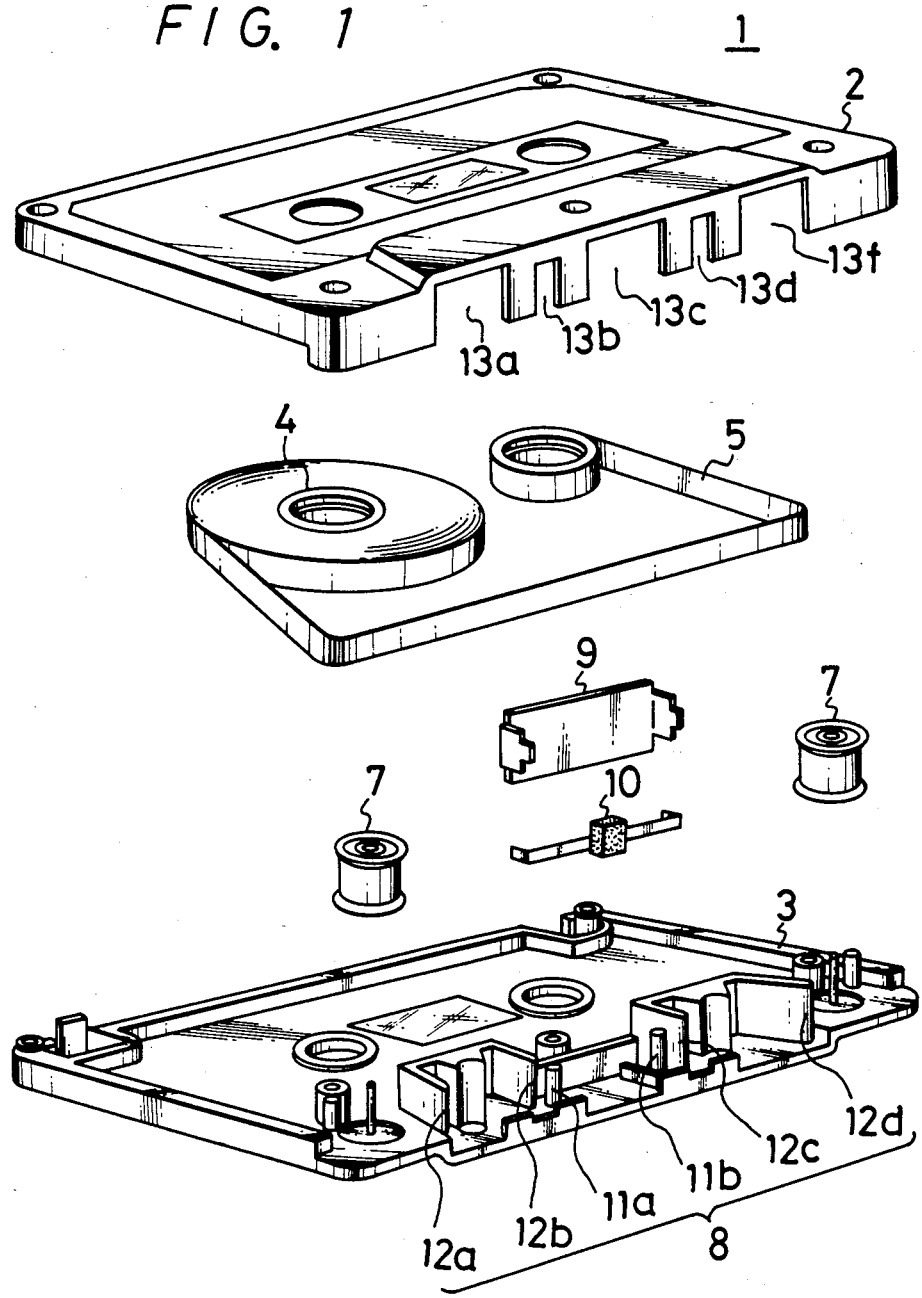
FIG. 1 is an exploded perspective view showing an embodiment of a magnetic tape cassette according to the present invention.

FIG. 1 is an exploded perspective view of an embodiment of the magnetic tape cassette according to the present invention. In FIG. 1, reference numeral 1 generally designates the whole of a magnetic tape cassette and 2 and 3 an upper half and a lower half which constitute a cassette case. At the front side wall of the cassette case, there are formed a plurality of openings 13a, 13b, 13c, 13d and 13f through which a magnetic head and a pinch roller are inserted. Inside the lower cassette half 3, there is provided a tape guide block 8 which is formed integral with the lower cassette half 3. The tape guide block 8 is the collective member of guide pins 11a, 11b and tape guide members 12a, 12b, 12c and 12d which are located in opposed relation to and near the above plurality of openings.

A magnetic tape 5 wrapped around a reel hub 4, guide rollers 7 and a head pad 10 supported by a shield plate 9 and the like are accommodated in the lower cassette half 3 and then the upper cassette half 2 is fitted thereto, which then are fixed by screws, thus the magnetic tape cassette 1 of a so-called two-piece type being constructed.

In the magnetic tape cassette of the present invention thus constructed, both the upper cassette half 2 and the lower cassette half 3 which integrally include therein a tape guide block 8 are made of ceramics or a composite material of ceramic material and synthetic resin.

Figure 2:
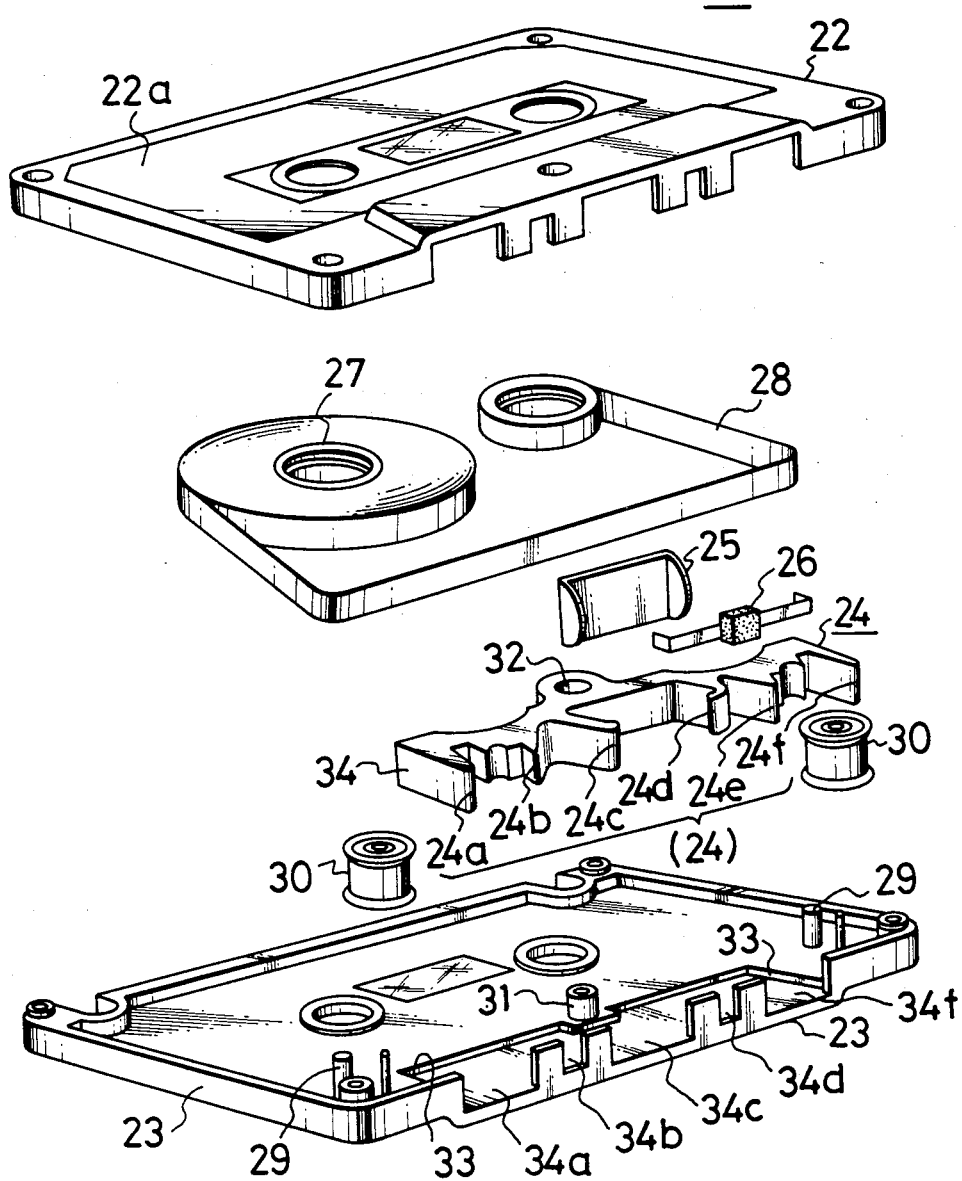
FIG. 2 is an exploded perspective view showing another embodiment of the magnetic tape cassette according to the present invention.

FIG. 2 is an exploded perspective illustrating another embodiment of the magnetic tape cassette according to the invention.

In FIG. 2, reference numeral 21 generally designates the whole of a magnetic tape cassette formed as a so-called three-piece type magnetic tape cassette. In this example, an upper cassette half 22, a lower cassette half 23 defining a cassette case with the upper half 22 and a tape guide block 24, which is located inside and near a plurality of front openings 34a, 34b, 34c, 34d and 34f provided in front of the cassette case are molded separately. This tape guide block 24 integrally includes tape guide members 24a, 24b, 24c, 24d, 24e and 24f, and a head pad 26 supported by a shield plate 25 is located at the center of the tape guide block 24. In this case, a magnetic tape 28 would around a reel hub 27 is guided along guide pins 29, guide rollers 30 and the tape guide block 24 so as to be transported.

The tape guide block 24 is fixed in such a manner that, as shown in FIG. 2, a screw pin 31 planted on the lower cassette half 23 is fitted into an aperture 32 formed through the tape guide block 24 and both side surfaces 34 of the tape guide block 24 are abutted against concave surface side portions 33 formed on the lower cassette half 23 and then they are fixed one another.

In fixing the tape guide block 24, the position of the tape guide block 24 in the vertical direction is restricted such that the thickness of the tape guide block 24 is made substantially the same as the width between the inside surfaces of the upper cassette half 22 and the lower cassette half 23. Also, it is possible that the tape guide block 24 is bonded to the lower cassette half 23 by adhesive agent.

In the embodiment of the magnetic tape cassette according to the present invention shown in FIG. 2, of the tape guide block 24 and both the upper cassette half 22 and the lower cassette half 23, at least the tape guide block 24 is made of ceramics or a composite material of ceramic material and synthetic resin material.

As the ceramic material for the embodiments of the invention described with reference to FIGS. 1 and 2, there can be used such a material as provided by molding solid of inorganic or non-metallic substance particles and then sintering the same which is so-called as fine ceramics such as $SiC$, $Si_3N_4$, $BN$, $TiN$, $WC$, $Al_2O_3$ and the like.

An example of the tape guide block 24 which is made of a reactive sintered silicon carbide as ceramic material will be described first.

The reactive sintered silicon carbide (RBSC) is formed by a so-called reactive sintering method in which silicon is injected into the mixture of silicon carbide $SiC$ and carbon in vaccum or the atmosphere of inert gas (for example, nitrogen gas) while they are being heated or the mixture of silicon carbide, silicon and carbon is heated in the non-oxidization atmosphere. The tape guide block 24 according to the embodiment of the invention is molded by, for example, the injection molding method. Namely, a block member long in the thickness direction corresponding to a plurality of tape guide blocks formed of a mixture of, for example, silicon carbide $SiC$, carbon and silicon is molded by the injection molding. This block member is then sintered at first in a furnace. This sintered block member is then cut with a constant thickness to provide a plurality of original tape guide block members. After that, this original tape guide block member formed of the mixture of silicon carbide, carbon and silicon is heated in the non-oxidization atmosphere to cause the reaction between the silicon and carbon so as to produce silicon carbide $SiC$ by which the whole of the original tape guide block member is sintered to form the desired tape guide block 24. The tape guide block 24 thus formed of the reactive sintered silicon carbide has a characteristic that is has small dependency on the property of the raw material of the silicon carbide. Moreover, since the silicon carbide sintered material formed by the reactive sintering method is quite small in shrinkage after being sintered and the temperature upon sintering is relatively low, it is suitable for manufacturing a product of complex shape such as the tape guide block and the like.

In the tape guide block 24 formed of the composite material of the ceramic material and the synthetic resin material, powder or fiber type fine ceramic material is used as the ceramic material, while as the synthetic resin material, there can be used a material which has a function as a binder for the ceramic material such as polyamide system material (nylon), polyolefin system material (polypropyrene, polyethylene) and polyester system material (polyethylene telephthalate, polybutylene telephthalate). In this case, the composition ratio between the ceramic material and the synthetic resin material is desired such that the ceramic material contained in the composition is preferably selected in a range from 30% to 50% in bulk or volume ratio.

The tape guide block 24 in this case can be molded by the injection molding method similar to the ordinary plastic molding method. To be more concrete, the mixture of the ceramic material and the synthetic resin material is injected into the injection metallic mold having the shapes of the cavity corresponding to the shape of the tape guide block 24 and then molded. The molded member thus made is in such a state that the melted synthetic resin material serves as the binder charged into each space between powder or fiber type ceramic material to bind them.

The tape guide block 24 formed of the ceramic material or the composite material of the ceramic material and the synthetic resin material is improved much in wearproof property, thermal conductivity, rigidity and so on as compared with the conventional tape guide block made of plastic material. Accordingly, the abrasion thereof caused by the transportation of the magnetic tape is suppressed and the heat generated at the contact portion thereof with the magnetic tape is radiated rapidly so that the magnetic tape is hardly slackened locally be the heat. Also, in addition to the improvement in the rigidity of the tape guide block 24, the tape guide members 24a and 24f thereof is of integral structure so that the occurrence of the distortion vibration in the guide members can be suppressed.

Figure 3:
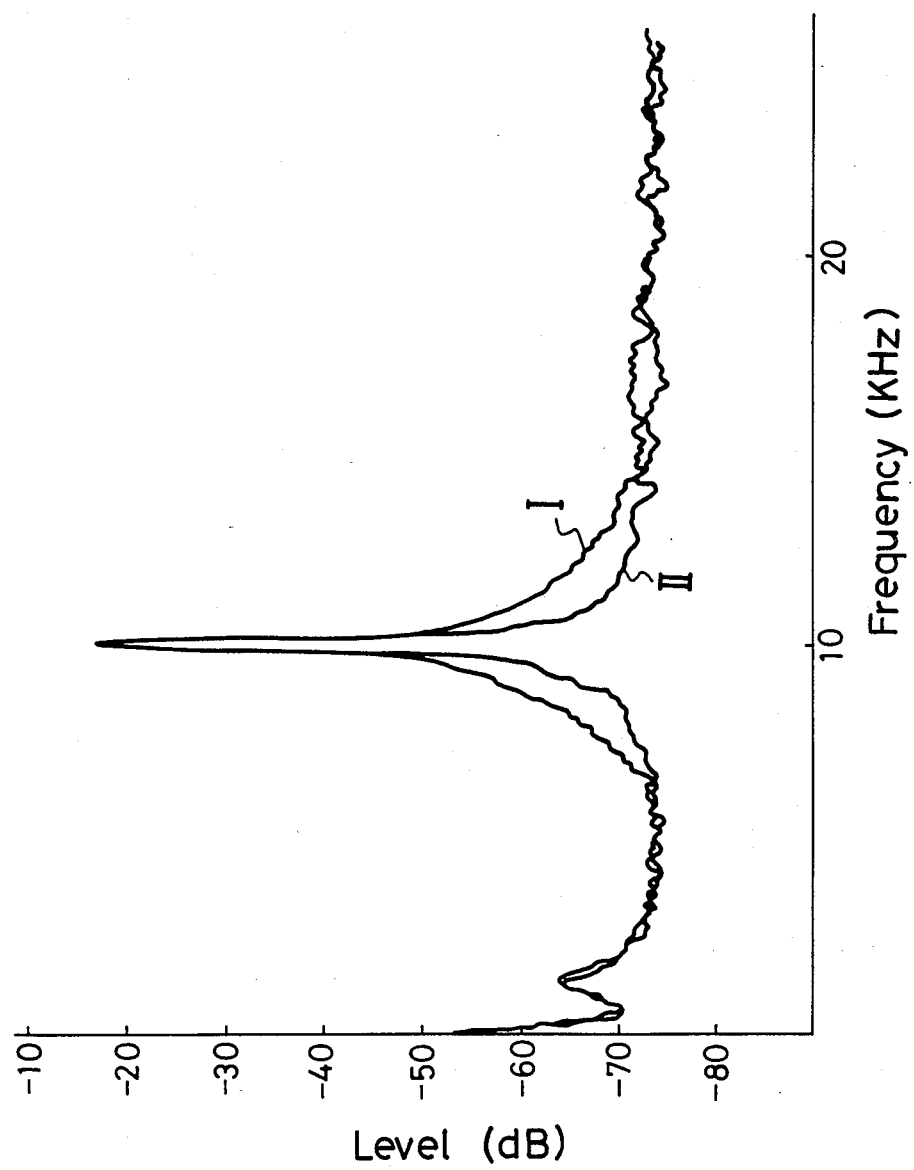
FIG. 3 is a graph showing measured results of a modulation noise characteristic of a conventional magnetic tape cassette formed of plastic material and the magnetic tape cassette according to the present invention.

FIG. 3 is a graph showing measured results of the modulation noise characteristic at the frequency of 10 kHz of the conventional magnetic tape cassette made of plastic material (indicated by a curve I) and that of the second embodiment of the magnetic tape cassette 21 (indicated by a curve II) of the present invention in which the tape guide block 24 (FIG. 2) is formed of the composite material having 40% of $Al_2O_3$ powder and 60% of polyamide system resin (by volume ratio). As to the modulation noise characteristic, it is preferred that the peak level at the central frequency is steep and the level in the skirt portions is low. As will be clear from the curves I and II in the graph of FIG. 3, the above characteristic of the magnetic tape cassette 21 of the invention is improved more.

The magnetic tape cassette according to the invention has the following characteristics on the factors which will exert an influence on the tone quality.

First, with respect to the wear-proof property, when, for example, the SiC is used, since its Vickers hardness Hv is 3000 which is quite a large value, the abrasion of the tape guide block 24 is hardly caused by the transportation of the magnetic tape 28.

With respect to the influence by the friction, in the present invention, the ceramic material (SiC) is used to make the tape guide members 24a, 24b, 24c, 24d, 24e and 24f of the tape guide block 24, while that of the magnetic tape 28 is the plastic material, so that the friction coefficient of the friction therebetween can be suppressed low.

Moreover, the heat generated at the contact portion of the tape guide block 24 with the magnetic tape 28 is rapidly radiated because the ceramic material (SiC) forming the tape guide block 24 has the excellent thermal conductivity. Therefore, the magnetic tape 28 is hardly slackened locally by heat. The experimental results shows that the thermal conductivity of the ceramics material (SiC) is the value more than 2000 times that of the plastic material.

Furthermore, with respect to the rigidity of the portions of the tape guide block 24 with which the magnetic tape 28 contacts, although such rigidity is indicated as the value of Young's modulus, if the shapes of the tape guide portions made of the ceramic material (SiC) and the plastic material is same, since the ceramic material shows the strength approximately 100 times as high as that of the plastic material, it is possible to suppress the occurrence of the distortion vibration of the guide particularly in the guide members 24c and 24d which are made of the ceramic material.

The superior characteristics described above are mainly of the second embodiment of the present invention shown in FIG. 2. However, the first embodiment of the present invention shown in FIG. 1 also has such characteristics substantially same as those of the second embodiment of the invention.

As set forth above, the magnetic tape cassette of the present invention, in which at least the tape guide block is formed of the ceramic material or the composite material of the ceramic material and the synthetic resin material, has the excellent characteristics in any one of vertical property, rigidity, wear-proof property, thermal conductivity and so on regarding the tape guide member as compared with those of the magnetic tape cassette made of plastic material. Thus, the magnetic tape cassette of the present invention having these characteristics set forth above can satisfy all the necessary conditions for the magnetic tape cassette which can prevent the tone quality from being deteriorated.

As a modified example of the magnetic tape cassette according to the second embodiment of the present invention, there may be considered such a magnetic tape cassette that the tape guide block 24 is molded by plastic material or metal, while the upper cassette half 22 and the lower cassette half 23 are made of the ceramic material or the composite material of the ceramic material and the synthetic resin material. In this case, the deformation of the cassette halves by the heat generated from the outside, the vibration and the external force can be prevented and thus it is possible to prevent the tape guide block 24 provided inside the cassette case from being affected badly from the outside.

Furthermore, such a magnetic tape cassette may be considered in which the whole, namely, the tape guide block 24 and the upper cassette half 22 and the lower cassette half 23 are all formed of the ceramic material or the composite material of the ceramic material and the synthetic resin. In this case, such a magnetic tape cassette may be made which satisfy the effects attained by both the second embodiment and the modified example of the second embodiment.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A tape cassette for holding a magnetic tape inside thereof comprising: a first member forming an upper half; a second member forming a lower half cooperating with said first member to define a case having an enclosed space for accommodating said magnetic tape; a plurality of openings formed in a front of wall portion of said case; and a third member that integrally includes a plurality of tape guide members for guiding said tape, arranged in said case and positioned near said openings, a fixed pin secured to one of said first or second members and interconnected to said third member, both side surfaces of said third member contacting respective concave surface portions formed on said first and second members whereby the position of said third member in vertical direction is restricted by the inside surfaces of said first and second members; said third member being formed of synthetic resin and ceramic power.

2. A tape cassette according to claim 1, wherein said ceramic powder is made of at least one of materials selected from the group consisting of SiC, $Si_3N_4$, BN, TiN, WC and $Al_2O_3$.

3. A tape cassette according to claim 1, wherein asaid synthetic resin is made of at least one of materials selected from the group consisting of polyamide, polyester and polyolefin.

4. A tape cassette according to claim 1 wherein said material making said third member contains said ceramic powder at volume ratio from 30% to 50% relative to said synthetic resin.

* * * * *